R. MILLER.
Cutting and Crushing Corn.
No. 3,775.
Patented Oct. 3, 1844.
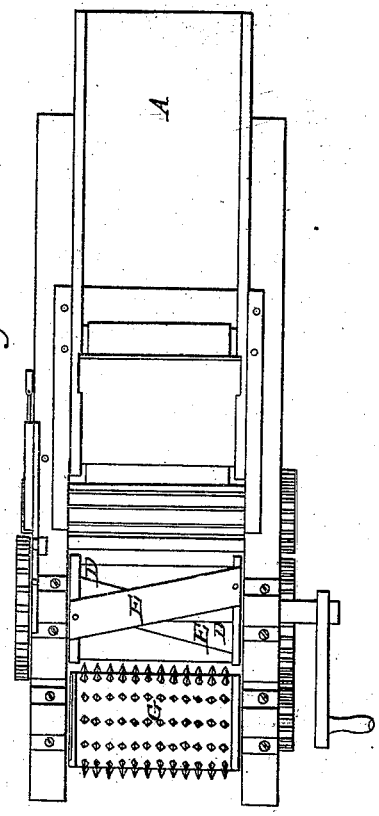
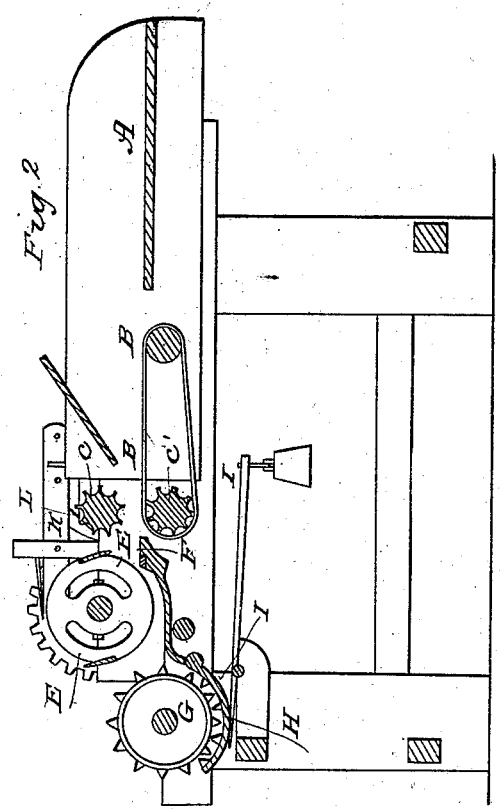
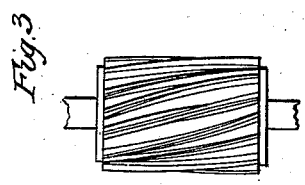
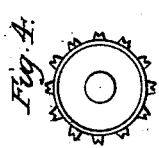

UNITED STATES PATENT OFFICE.

RUDOLPH MILLER, OF YORK, PENNSYLVANIA.

IMPROVEMENT IN CUTTING AND CRUSHING CORN-FODDER.

Specification forming part of Letters Patent No. 3,775, dated October 3, 1844.

*To all whom it may concern:*

Be it known that I, RUDOLPH MILLER, of the borough of York, in the county of York and State of Pennsylvania, have made certain new and useful Improvements in a Machine for Cutting and Crushing Corn-Fodder; and I do hereby declare that the following is a full and exact description thereof.

In my machine the fodder or other like article which is to be cut and crushed is to be laid upon a feeding-apron, which, passing around rollers made to revolve intermittingly by means of a feed-hand and ratchet-wheel in the ordinary way, carries the fodder under revolving cutters, consisting of knives extending across from one circular disk or head to another, by which the fodder is cut into suitable lengths. As it is cut the pieces fall down and pass in between a roller furnished with teeth or flutes and a concave similarly furnished, and this toothed or fluted cylinder being made to revolve rubs and crushes the fodder and reduces it to a state much better adapted to the feeding of animals than when merely cut in the usual manner.

In the accompanying drawings, Figure 1 is a top view or plan of my machine, and Fig. 2 a vertical section thereof through the middle from end to end. A A is a platform or board forming the bottom of a trough on which the fodder is to be laid. B B is the feeding-apron, onto which it is to be advanced from the board A. C C' are two feeding-rollers, around the lowermost of which the endless apron passes. D D are the heads, and E E the knives, of the cutting-cylinder. F is a bar against which the cutting-knives act. As the fodder is cut off, it is carried onward and between the toothed or fluted roller G and the concave H. The concave is hinged at its upper edge, and is borne up against the cylinder G by means of the weighted levers I I, by which the fodder is rubbed or crushed with any requisite degree of force.

Fig. 3 is a top view, and Fig. 4 a transverse section through a cylinder which is fluted and which I intend sometimes to use instead of the toothed cylinder G. J is a winch, by which the cutting-cylinder may be made to revolve. K is a lever carrying a feed-hand L, which acts on a ratchet-wheel on the shaft of the feed-roller C'. The lever L may be lifted by a cam. (Shown in dotted lines at M.) This kind of gearing is well known and may be variously modified.

Having thus fully described the manner in which I construct my machine for cutting and crushing corn-fodder and shown the operation thereof, what I claim therein as new, and desire to secure by Letters Patent, is—

The manner in which I have arranged and combined the cutting and the crushing or rubbing apparatus, substantially as set forth.

RUDOLPH MILLER.

Witnesses:
H. M. McCLELLAN,
JACOB GLESSNER.